(12) United States Patent
Hsu et al.

(10) Patent No.: US 12,002,313 B2
(45) Date of Patent: Jun. 4, 2024

(54) VEHICLE SAFETY SYSTEM, DISTANCE DETERMINATION METHOD, AND VEHICLE

(71) Applicant: Gogoro Inc., Hong Kong (CN)

(72) Inventors: Liang-Yi Hsu, Taoyuan (TW); I-Sheng Chen, Taoyuan (TW); Yong-Sheng Chen, Taoyuan (TW); Wei-Tsung Huang, Taoyuan (TW)

(73) Assignee: Gogoro Inc., Hong Kong (CN)

( * ) Notice: Subject to any disclaimer, the term of this patent is extended or adjusted under 35 U.S.C. 154(b) by 156 days.

(21) Appl. No.: 17/831,265

(22) Filed: Jun. 2, 2022

(65) Prior Publication Data

US 2022/0406109 A1 Dec. 22, 2022

Related U.S. Application Data

(60) Provisional application No. 63/212,897, filed on Jun. 21, 2021.

(51) Int. Cl.
| | |
|---|---|
| *G07C 9/00* | (2020.01) |
| *B62J 43/20* | (2020.01) |
| *B62J 43/30* | (2020.01) |
| *H04B 17/318* | (2015.01) |
| *H04W 4/02* | (2018.01) |

(52) U.S. Cl.
CPC .......... *G07C 9/00309* (2013.01); *B62J 43/20* (2020.02); *B62J 43/30* (2020.02); *H04B 17/318* (2015.01); *H04W 4/023* (2013.01); *H04W 4/027* (2013.01); *G07C 2009/005* (2013.01); *G07C 2009/00769* (2013.01); *G07C 2209/08* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 8,948,782 B2* | 2/2015 | Shang | H04W 4/023 455/456.2 |
| 10,039,145 B2* | 7/2018 | Alipour | H04W 76/10 |
| 2015/0332248 A1 | 11/2015 | Weksler et al. | |

(Continued)

FOREIGN PATENT DOCUMENTS

| | | |
|---|---|---|
| EP | 3594913 A2 | 1/2020 |
| TW | 498587 B | 8/2002 |
| WO | 2020205364 A1 | 10/2020 |

OTHER PUBLICATIONS

Office Action mailed on Jul. 25, 2023 for Taiwan Patent Application No. 112120560, 7 pages.

(Continued)

*Primary Examiner* — K. Wong
(74) *Attorney, Agent, or Firm* — Perkins Coie LLP

(57) ABSTRACT

A distance determination method has: detecting a first received signal strength indicator (RSSI) of a first electronic device by a second electronic device; detecting a second RSSI of the second electronic device by the first electronic device; obtaining the first RSSI from the second electronic device by the first electronic device; and calculating a motion direction and a distance of the second electronic device relative to the first electronic device according to the first RSSI and the second RSSI by the first electronic device.

17 Claims, 11 Drawing Sheets

(56) References Cited

U.S. PATENT DOCUMENTS

2016/0063782 A1\* 3/2016 Yu ........................... B62J 45/20
                                                    340/5.61
2018/0222332 A1\* 8/2018 Hosaka .................... H02J 7/24
2022/0332285 A1\* 10/2022 Sanders ................ G06F 3/0484

OTHER PUBLICATIONS

Partial European Search Report mailed on Oct. 18, 2022 for European Patent Application No. 22176674.4; 14 pages.
European Search Report mailed Jun. 14, 2023 for European Patent Application No. 22176674.4, 6 pages.

\* cited by examiner

VEHICLE SAFETY SYSTEM, DISTANCE DETERMINATION METHOD, AND VEHICLE

CROSS-REFERENCE TO RELATED APPLICATION

This application claims priority to U.S. Provisional Application Ser. No. 63/212,897, filed Jun. 21, 2021, which is herein incorporated by reference in its entirety.

BACKGROUND

Technical Field

The present disclosure relates to a vehicle safety system, a distance determination method, and a vehicle.

Description of Related Art

In order to automatically lock/unlock a vehicle, the distance between the vehicle and a remote device of a user (e.g., such as a key thereof) needs to be accurately determined. In the related art, a distance determination method of determining the distance between the remote device and the vehicle is detecting the RSSI (Received Signal Strength Indicator) of a wireless signal sent from the remote device to the vehicle and calculating the distance by using only the single RSSI. However, the distance determination method often cannot accurately determine the position and distance of the remote device relative to the vehicle, so the vehicle may lock/unlock based on inaccurate distance.

Accordingly, how to provide a distance determination method that can solve the aforementioned problems becomes an important issue to be solved by those in the industry.

SUMMARY

An aspect of the disclosure is to provide a distance determination method that can efficiently solve the aforementioned problems.

According to an embodiment of the disclosure, a distance determination method includes: detecting a first received signal strength indicator (RSSI) of a first electronic device by a second electronic device; detecting a second RSSI of the second electronic device by the first electronic device; obtaining the first RSSI from the second electronic device by the first electronic device; and calculating a motion direction and a distance of the second electronic device relative to the first electronic device according to the first RSSI and the second RSSI by the first electronic device.

In an embodiment of the disclosure, the calculating includes calibrating the motion direction and the distance based on the second RSSI with reference to the first RSSI by the first electronic device.

In an embodiment of the disclosure, the distance determination method further includes obtaining the second RSSI from the first electronic device by the second electronic device. The calculating includes calibrating the motion direction and the distance based on the first RSSI with reference to the second RSSI by the second electronic device.

In an embodiment of the disclosure, one of the first electronic device and the second electronic device is a remote device or an accessory. Another of the first electronic device and the second electronic device is a communication module attached to a vehicle.

In an embodiment of the disclosure, the distance determination method further includes automatically locking/unlocking the vehicle based on the motion direction and the distance.

In an embodiment of the disclosure, the distance determination method further includes establishing a first connection between the remote device the communication module; establishing a second connection between the remote device the accessory; and establishing a third connection based on the first connection and the second connection.

In an embodiment of the disclosure, the distance determination method further includes certificating the first connection. The certificating includes: requesting a random number from the communication module by the remote device; providing the random number to the remote device by the communication module; transferring the random number to a server by the remote device; creating a temporary key by the server in response to receiving of the random number; providing the temporary key to the communication module via the remote device by the server; and verifying the temporary key with a built-in authentication code pre-stored in the communication module by the communication module.

In an embodiment of the disclosure, the calculating includes averaging the first RSSI and the second RSSI.

In an embodiment of the disclosure, the distance determination method further includes retrieving a first RSSI-distance curve of the first RSSI; retrieving a second RSSI-distance curve of the second RSSI; and calculating a third RSSI-distance curve based on the first RSSI-distance curve and the second RSSI-distance curve. The calculating includes calculating the motion direction and the distance based on the third RSSI-distance curve.

In an embodiment of the disclosure, the calculating the third RSSI-distance curve includes at least one of: averaging the first RSSI-distance curve and the second RSSI-distance curve; calculating the third RSSI-distance curve by resampling the first RSSI-distance curve and the second RSSI-distance curve at different sampling distances; and calculating the third RSSI-distance curve by iteratively resampling the first RSSI-distance curve and the second RSSI-distance curve as sampling distance changes.

According to an embodiment of the disclosure, a vehicle includes a frame, a communication module, and communication module. The communication module is fixed on the frame and includes a charging connector. The power delivery charger is fixed to the frame, is detachably connected to the charging connector, and is configured to supply power to the communication module via the charging connector.

In an embodiment of the disclosure, the vehicle further includes a bag tied on the frame. The power delivery charger is accommodated in the bag.

In an embodiment of the disclosure, the vehicle further includes a rear wheel rotatably connected to the frame. The communication module is a hub device installed on the rear wheel.

In an embodiment of the disclosure, the vehicle further includes a hard housing and a bag. The hard housing is connected to the frame. The bag hangs on the hard housing. The power delivery charger is accommodated in the bag.

In an embodiment of the disclosure, the vehicle further includes a rear wheel and a seat cushion. The rear wheel is rotatably connected to the frame. The seat cushion is connected to the frame. The hard housing is located under the seat cushion and extends toward the rear of the vehicle above the rear wheel.

In an embodiment of the disclosure, the frame has an opening at a bottom side thereof and is hollow inside. The power delivery charger is accommodated in the frame. The opening is configured to allow the power delivery charger to pass through.

In an embodiment of the disclosure, the vehicle further includes a sealing member sealing the opening.

According to another embodiment of the disclosure, a distance determination method includes: plotting a first RSSI-distance curve of a first RSSI of a first electronic device; plotting a second RSSI-distance curve of a second RSSI of a second electronic device; plotting a third RSSI-distance curve based on the first RSSI-distance curve and the second RSSI-distance curve; and calculating a motion direction and a distance of the second electronic device relative to the first electronic device based on the third RSSI-distance curve.

In an embodiment of the disclosure, one of the first electronic device and the second electronic device is a remote device of a user. Another of the first electronic device and the second electronic device is a communication module attached to a vehicle of the user.

In an embodiment of the disclosure, the distance determination method further includes automatically locking/unlocking the vehicle based on the motion direction and the distance.

In an embodiment of the disclosure, the plotting the third RSSI-distance curve includes plotting the third RSSI-distance curve based on by averaging the first RSSI-distance curve and the second RSSI-distance curve.

In an embodiment of the disclosure, the plotting the third RSSI-distance curve includes plotting the third RSSI-distance curve by resampling the first RSSI-distance curve and the second RSSI-distance curve.

In an embodiment of the disclosure, the plotting the third RSSI-distance curve further includes plotting the third RSSI-distance curve by resampling the first RSSI-distance curve and the second RSSI-distance curve at different sampling distances.

In an embodiment of the disclosure, the plotting the third RSSI-distance curve further includes plotting the third RSSI-distance curve by iteratively resampling the first RSSI-distance curve and the second RSSI-distance curve as sampling distance changes.

Accordingly, in the distance determination method of the present disclosure, two-way RSSI is adopted, so that the distance between two electronic devices can be accurately determined. In this way, by using the distance determination method in the embodiments that the two electronic devices are a remote device of a user and a communication module attached to a vehicle, at least the purpose of automatically locking/unlocking the vehicle with a better accuracy can be achieved based on the accurate distance determined by the distance determination method.

It is to be understood that both the foregoing general description and the following detailed description are by only examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
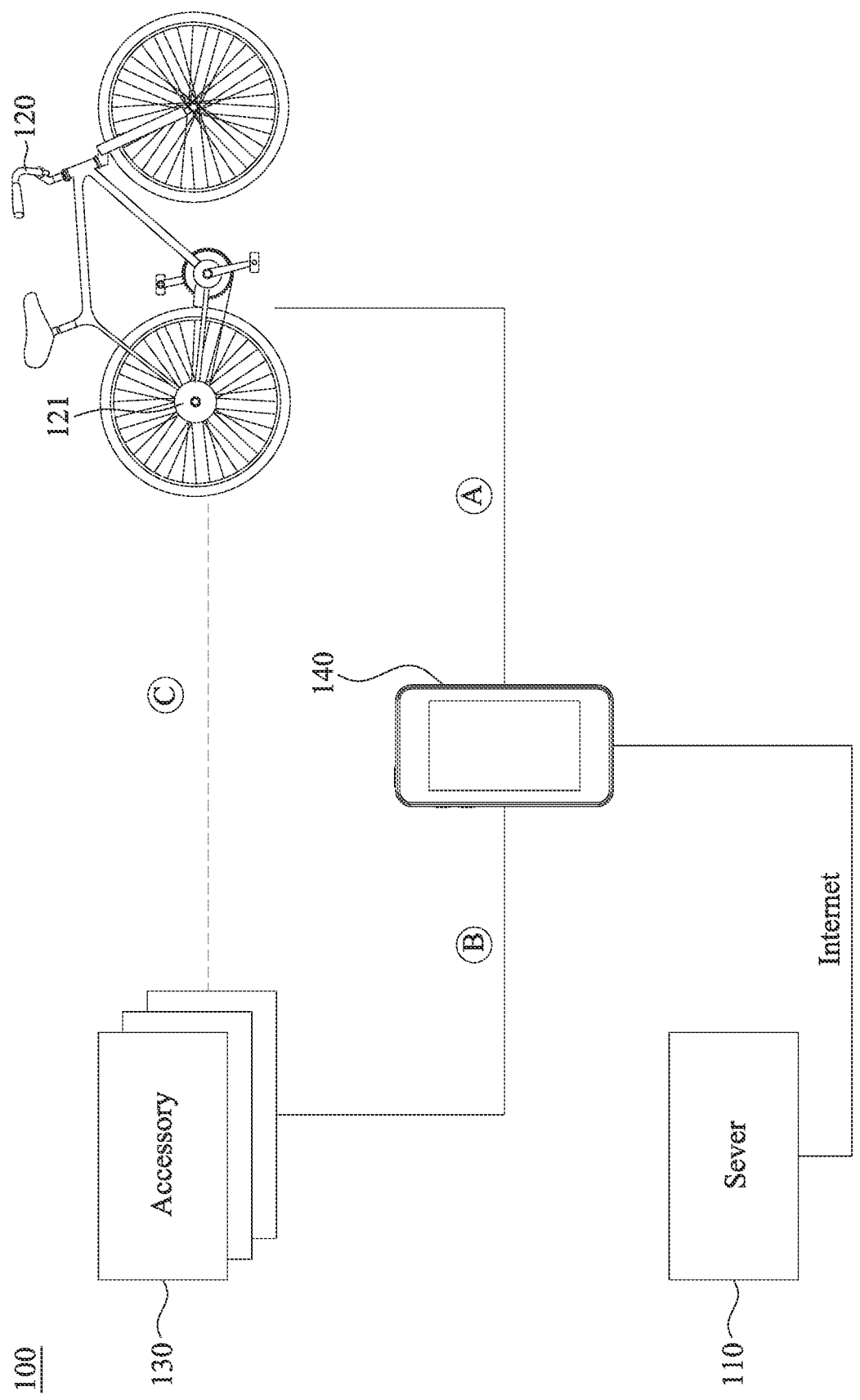
FIG. 1 is a schematic diagram of a vehicle safety system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram of a vehicle safety system 100 according to some embodiments of the present disclosure. As shown in FIG. 1, in the present embodiment, the vehicle safety system 100 includes a server 110, a communication module 121, and at least one accessory 130. The server 110 is configured to communicate with a remote device 140 (e.g., a smart phone, a smart wearable device, or other portable device) held by a user. For example, the user may wirelessly communicate with the server 110 by an application program operating on the remote device 140 through Internet. Data associated with the remote device 140 may be stored in the server 110. The communication module 121 is configured to communicate with the remote device 140 through a short-distance transmission protocol (e.g., Bluetooth or Wi-Fi module), and may be directly installed on a vehicle 120 or may be attached to any one of components on the vehicle 120. The accessory 130 is also configured to communicate with the remote device 140 through the short-distance transmission protocol. In addition, the communication module 121 and the accessory 130 are configured to communicate with each other through the short-distance transmission protocol.

In some embodiments, the vehicle 120 is an electric car, scooter, or bicycle, but the disclosure is not limited in this regard.

In some embodiments, the communication module 121 may be a hub device installed on the rear wheel of the vehicle 120, but the disclosure is not limited in this regard.

In some embodiments, the accessory 130 may be a handlebar detachably installed on the vehicle 120, but the disclosure is not limited in this regard. In some other embodiments, the accessory 130 may be a smart helmet or other personal wear parts.

Under the architecture of the vehicle safety system 100, in some embodiments, the wireless data connection (such as the connection C as shown in FIG. 1) between the communication module 121 and the accessory 130 may be established through the remote device 140.

Figure 2:
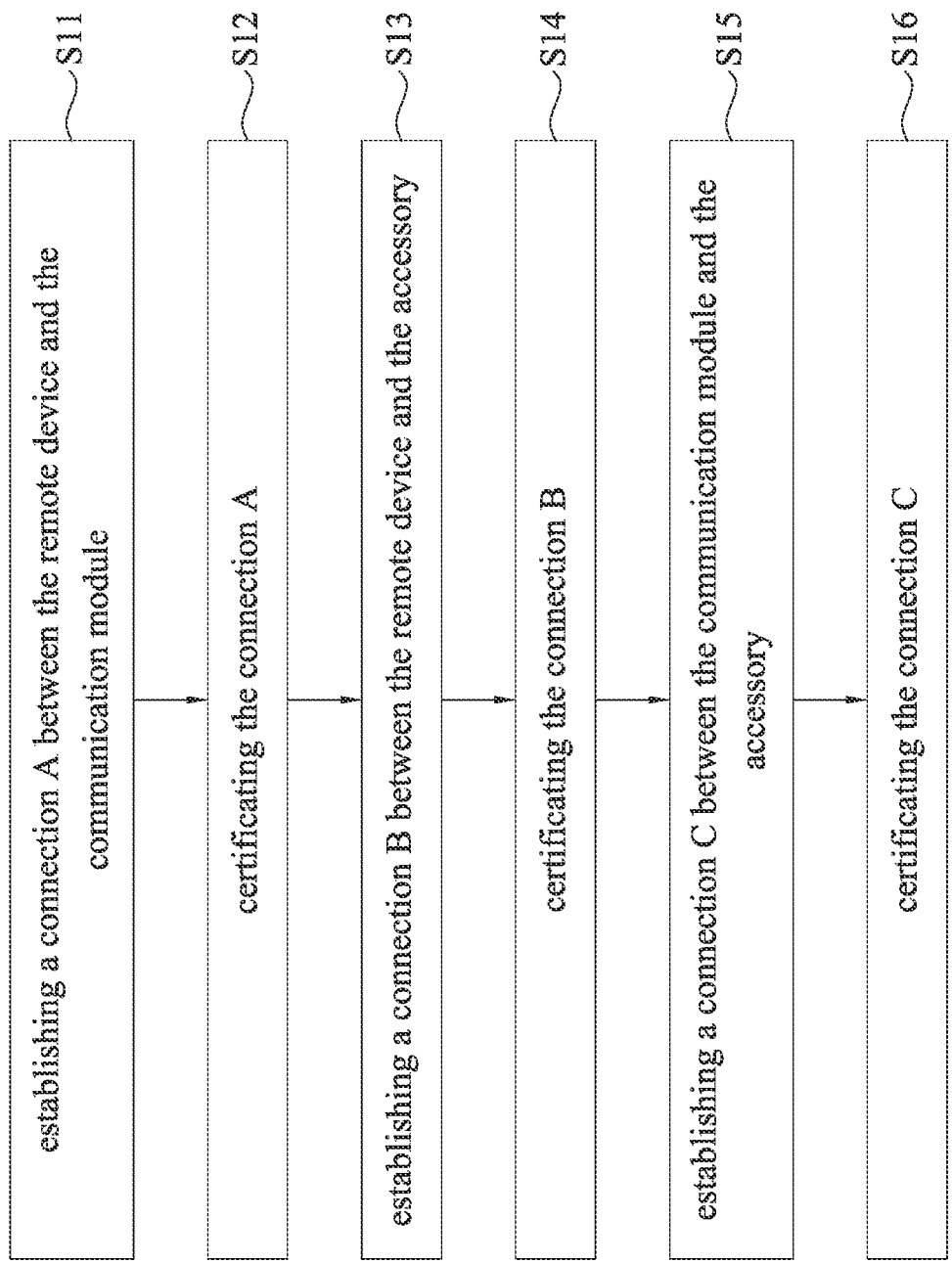
FIG. 2 is a flowchart of establishing the wireless data connection between the communication module and the accessory according to some embodiments of the present disclosure.

Reference is made to FIG. 2. FIG. 2 is a flowchart of establishing the wireless data connection between the communication module 121 and the accessory 130 according to some embodiments of the present disclosure. As shown in FIG. 2 with reference to FIG. 1, the flowchart includes steps S11-S16.

In step S11, a connection A is established between the remote device 140 and the communication module 121.

In step S12, the connection A is certificated. For example, data (such as a string of characters or a certification key) associated with the certification of the connection A may be transferred to the server 110 through the remote device 140 and stored in the server 110.

Figure 3:
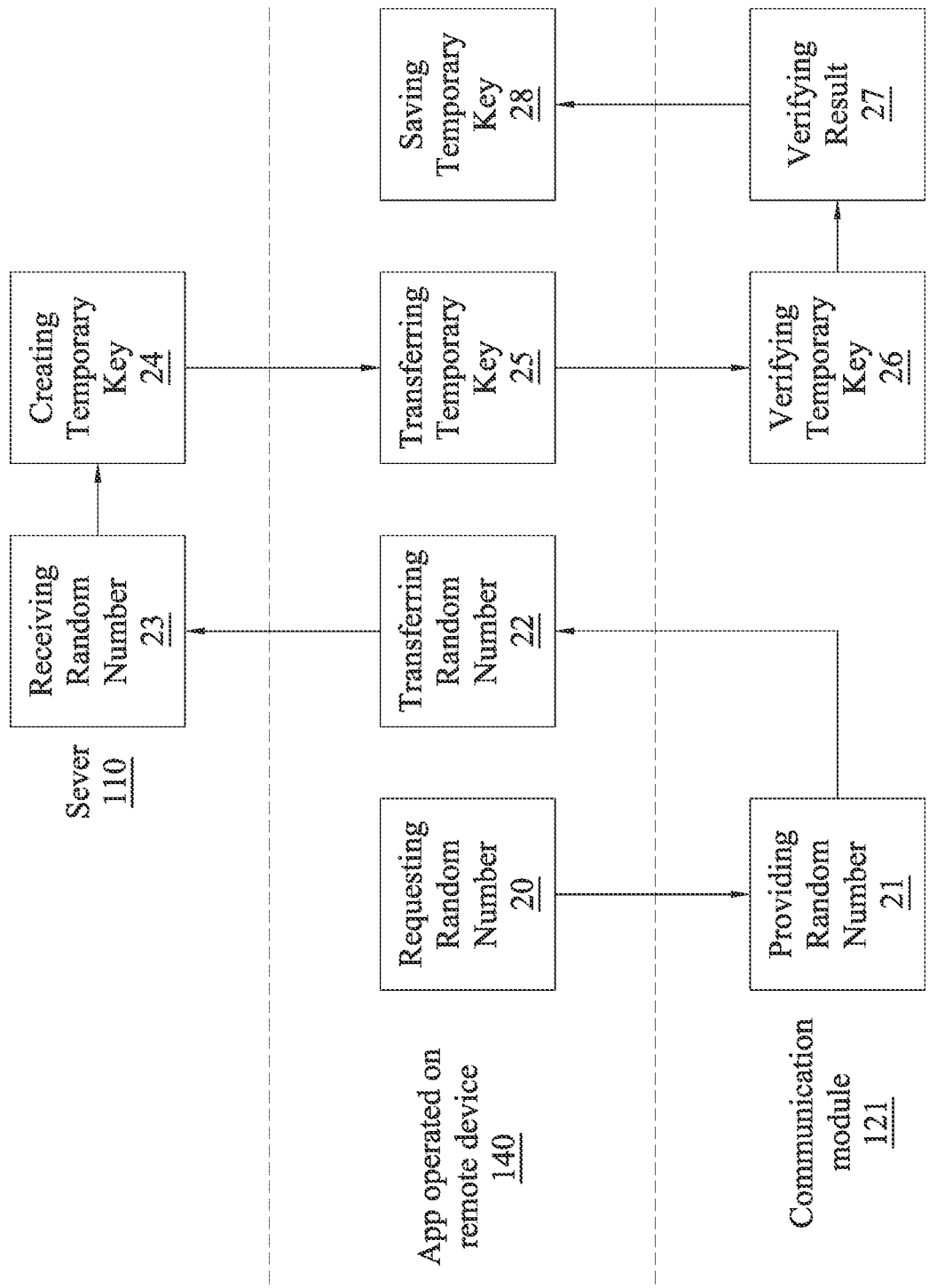
FIG. 3 is a schematic diagram showing a certification procedure according to some embodiments of the present disclosure.

Reference is made to FIG. 3. FIG. 3 is a schematic diagram showing a certification procedure according to some embodiments of the present disclosure. As shown in FIG. 3, the certification of the connection A may be initiated by the remote device 140 (e.g., via an App installed therein). In the beginning (block 20), the remote device 140 may request a random number from the communication module 121 (e.g., the hub device). The communication module 121 may provide the random number as requested (block 21), and the remote device 140 may transfer the provided random number to the server 110 (block 22). The server 110 is configured to create a temporary key in response to receiving of the random number (block 24) and provide the temporary key to the communication module 121 via the remote device 140 (block 25). The communication module 121 is configured to verify the temporary key with a built-in authentication code pre-stored in the communication module 121 (block 26). When the temporary key matches the built-in authentication code, the certification procedure of the connection A is certificated (block 28, i.e., confirmed as successful), and the temporary key may be then stored in the remote device 140 (block 28).

In step S13, a connection B is established between the remote device 140 and the accessory 130.

In some embodiments, the certification of the connection B may be performed by the server 110, the remote device 140, and the accessory 130 in a manner similar to the certification procedure among the server 110, the remote device 140, and the communication module 121, but the disclosure is not limited in this regard.

In step S14, the connection B is certificated. For example, data associated with the certification of the connection B may be transferred to the server 110 through the remote device 140 and stored in the server 110.

In step S15, the connection C is established between communication module 121 and the accessory 130.

In some embodiments, the connection C may be initiated by the remote device 140 via the connection A or the connection B. In some embodiments, only when the connection A and connection B are established, the remote device 140 can start the process of establishing the connection C. In some embodiments, the process of establishing the connection C can be executed automatically or manually.

In step S16, the connection C is certificated. For example, data associated with the certification of the connection C may be transferred to the server 110 through the remote device 140 and stored in the server 110.

In some embodiments, the certification of the connection C may be performed by the accessory 130, the remote device 140, and the communication module 121 in a manner similar to the certification procedure among the server 110, the remote device 140, and the communication module 121, but the disclosure is not limited in this regard.

In some embodiments, once the connection C are established for the first time, the communication module 121 and the accessory 130 can be automatically connected after booting without going through the remote device 140.

With the aforementioned configurations, the vehicle safety system 100 can at least perform following embodiments/applications (1)-(4).

(1) When the communication module 121 or the accessory 130 detects illegal starting or moving of the vehicle 120, measures such as locking the vehicle 120 are taken. In some embodiments, the illegal starting or moving of the vehicle 120 may be identified when the certificated connection C between the communication module 121 and the accessory 130 is not available after they are booted. In some embodiments, the illegal starting or moving of the vehicle 120 may identified when the GPS data detected by the communication module 121 and/or the accessory 130 have changed after they are booted.

(2) After the vehicle 120 is reported lost, the log data during the lost time period can be read as evidence.

(3) In the scenario where the vehicle 120 can be rented, the user can select at least one of a plurality of accessories 130 to connect it via the remote device 140, thus increasing the flexibility of the renting service of the vehicle 120.

(4) In the scenario where the accessory 130 is a handlebar and the remote device 140 is a smart phone equipped with sensors (e.g., a gyro sensor, an accelerometer, etc.), data detected by the sensors may be provided to the handlebar for automatic start of direction lights or automatic shutdown for power saving. In addition, the handlebar may obtain information (e.g., power state of battery, temperature of battery, etc.) of the vehicle 120 through the communication module 121, display the information, and even use lights to remind user (e.g., indicating low power, overheat protection, etc.) according to the information.

Figure 4:
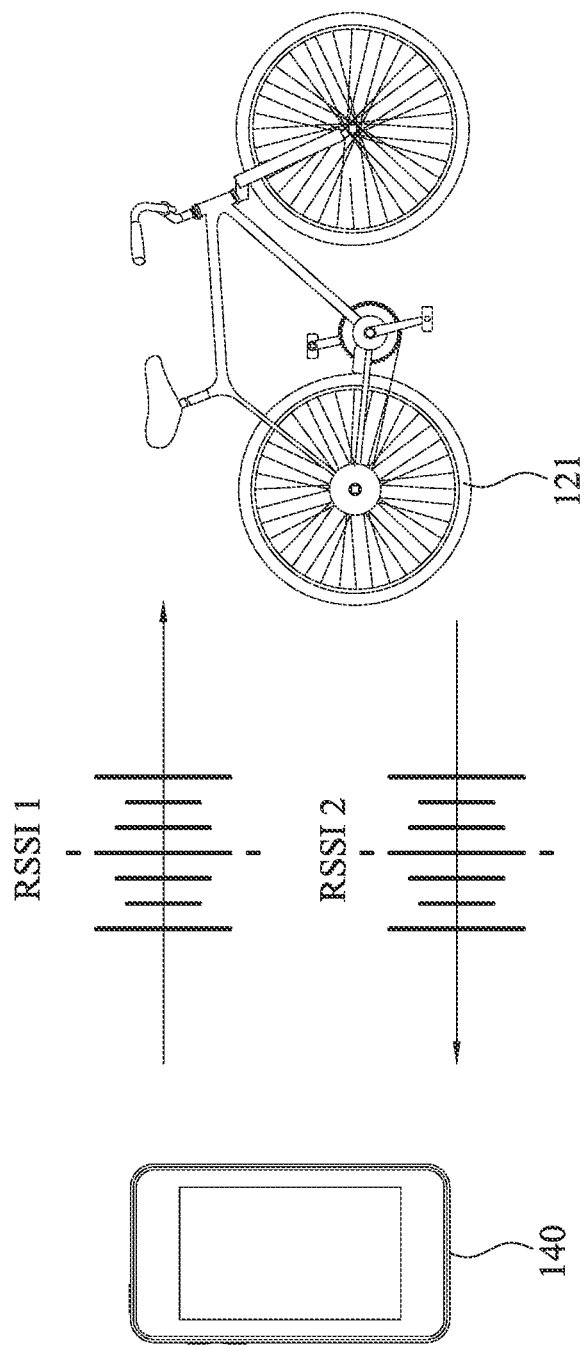
FIG. 4 is a schematic diagram showing signal transmission between a remote device of a user and a communication module attached to a vehicle.
Figure 6:
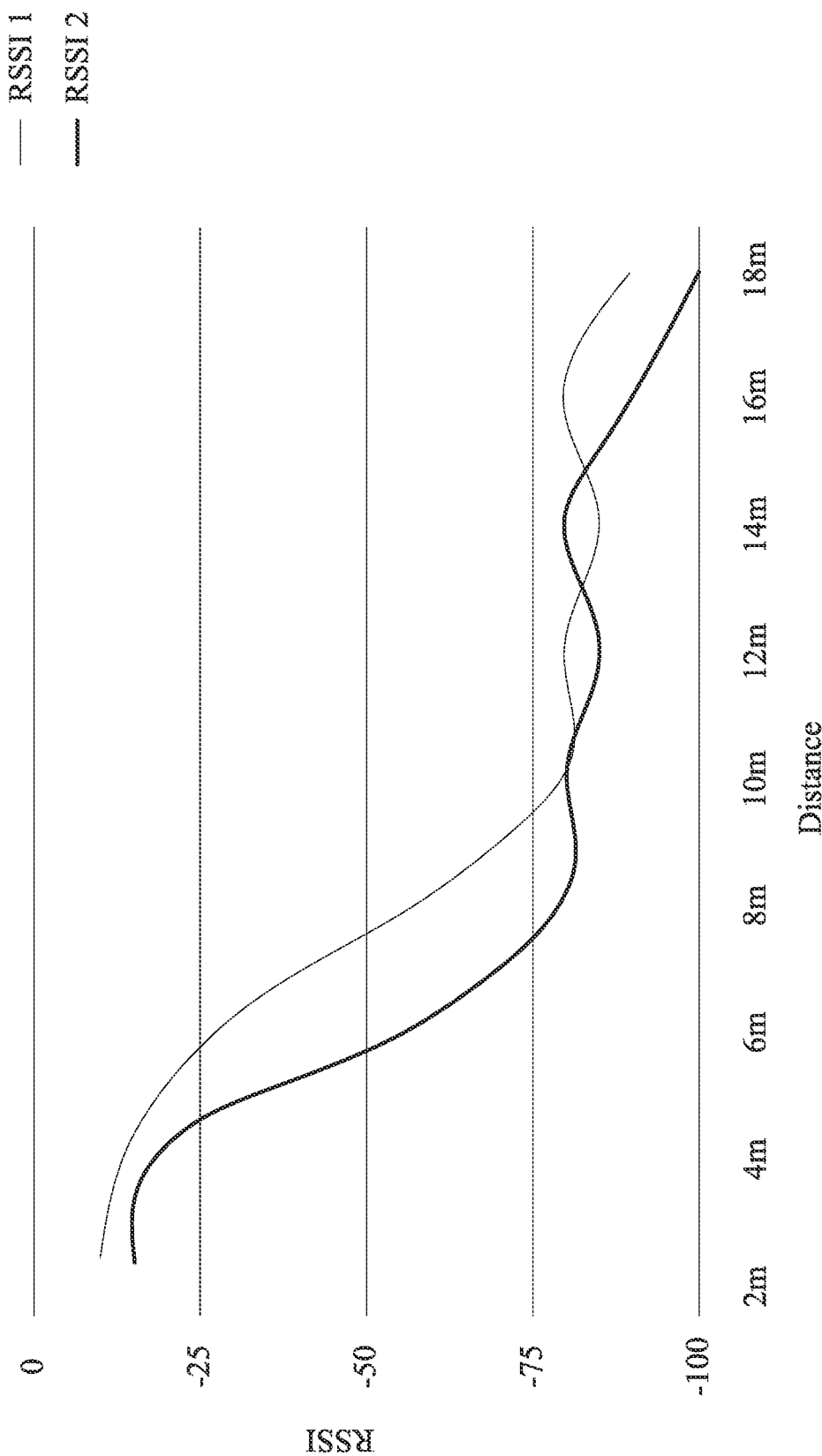
FIG. 6 shows RSSI-distance curves according to some embodiments of the present disclosure.

Reference is made to FIGS. 4 and 6. FIG. 4 is a schematic diagram showing signal transmission between the remote device 140 of the user and the communication module 121 attached to the vehicle 120. FIG. 6 shows RSSI-distance (Received Signal Strength Indicator-distance) curves according to some embodiments of the present disclosure. It should be pointed out that at least for the purpose of automatically locking/unlocking the vehicle 120, it is extremely important to accurately determine the distance between the remote device 140 of the user and the vehicle 120. In order to improve the accuracy of distance determination, two-way RSSI is adopted. In some embodiments, the communication module 121 is configured to detect RSSI 1 of the remote device 140, and the remote device 140 is configured to detect RSSI 2 of the communication module 121.

Figure 5:
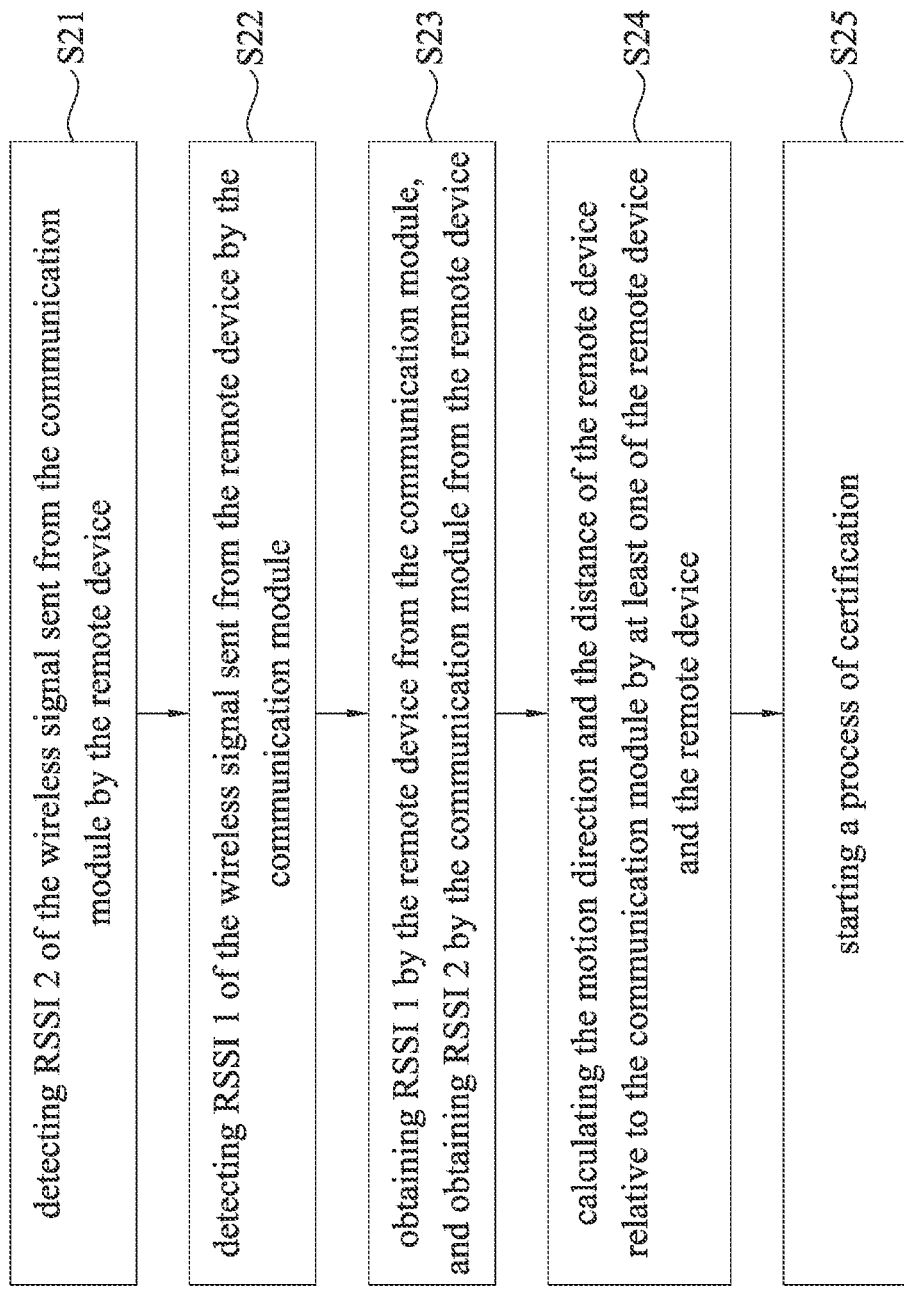
FIG. 5 is a flowchart of a distance determination method according to some embodiments of the present disclosure.

Reference is made to FIG. 5. FIG. 5 is a flowchart of a distance determination method according to some embodiments of the present disclosure. As shown in FIG. 5, the distance determination method may include steps S21-S25.

In the beginning, the remote device 140 (first electronic device) and the communication module 121 (second electronic device) send wireless signals to each other or broadcast the wireless signals.

In some embodiments, the remote device 140 may be replaced with the accessory 130 (such as a smart key), and the method may determine a distance of the accessory 130 and the communication module 121.

In step S21, RSSI 2 (second RSSI) of the wireless signal sent from the communication module 121 is detected by the remote device 140.

In step S22, RSSI 1 (first RSSI) of the wireless signal sent from the remote device 140 is detected by the communication module 121.

In step S23, RSSI 1 is obtained by the remote device 140 from the communication module 121, and RSSI 2 is obtained by the communication module 121 from the remote device 140.

In step S24, the motion direction and the distance of the remote device 140 relative to the communication module 121 is calculated by at least one of the remote device 140 and the remote device 140.

In some embodiments, the remote device 140 is configured to calibrate the motion direction and the distance based on RSSI 2 with reference to RSSI 1. In some embodiments, the communication module 121 is configured to calibrate the motion direction and the distance based on RSSI 1 with reference to RSSI 2.

In step S25, a process of certification is started. In some embodiments, the process of certification is started when the distance matches with a default condition. In some embodiments, the default condition may include at least one of: the distance remaining the same or continuing to decrease; the distance being less than a threshold distance (such as 300 centimeters); and the distance being within a threshold distance range (such as 10-200 centimeters).

After performing the distance determination introduced above, the purpose of automatically locking/unlocking the vehicle 120 can be accurately achieved based on the calibrated motion direction and distance.

In some embodiments, data of RSSI 1 curve (such as a relationship obtained by test of RSSI 1 value and distance) for the remote device 140 is stored in the remote device 140 in advance, and data of RSSI 2 curve (such as a relationship obtained by test of RSSI 2 value and distance) for the communication module 121 is stored in the communication module 121 in advance. The remote device 140 and the communication module 121 may exchange their RSSI curves after the connection between them is established. Thus, both the remote device 140 and the communication module 121 have the data of RSSI 1 curve and data of RSSI 2 curve. After the exchange of RSSI 1 curve and RSSI 2 curve, the remote device 140 and the communication module 121 may determine the RSSI 1 distance based on the current RSSI 1 and the RSSI 1 curve, and determine the RSSI 2 distance based on the current RSSI 2 and the RSSI 2 curve.

Figure 7:
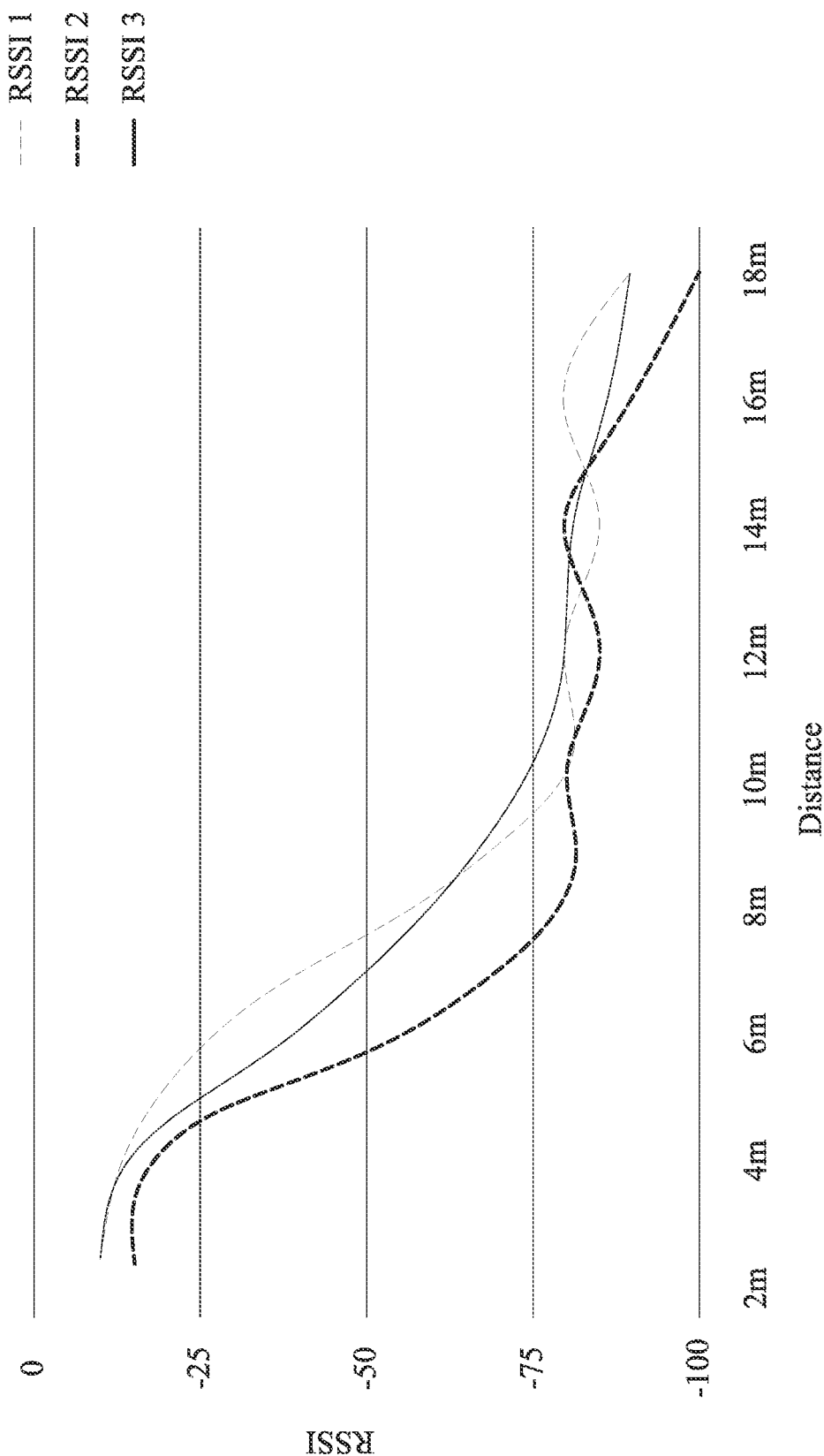
FIG. 7 shows a RSSI-distance curve after compensation according to some embodiments of the present disclosure.

Reference is made to FIG. 7. FIG. 7 shows a RSSI-distance curve after compensation according to some embodiments of the present disclosure. The compensation refers to the calibration of RSSI described hereafter. As shown in FIG. 7, calibrated RSSI 3 is obtained by equation 1.

$$RSSI3=(RSSI1+RSSI2)/2 \qquad \text{(equation 1)}$$

It can be seen that the RSSI-distance curve of RSSI 3 can be obtained by directly averaging the RSSI-distance curves of RSSI 1 and RSSI 2, but the disclosure is not limited in this regard. In some embodiments, RSSI 1 and RSSI 2 may be respectively assigned the different average weights. For example, the equation 1 may be modified to "RSSI 3=0.4*RSSI 1+0.6*RSSI 2".

Figure 8:
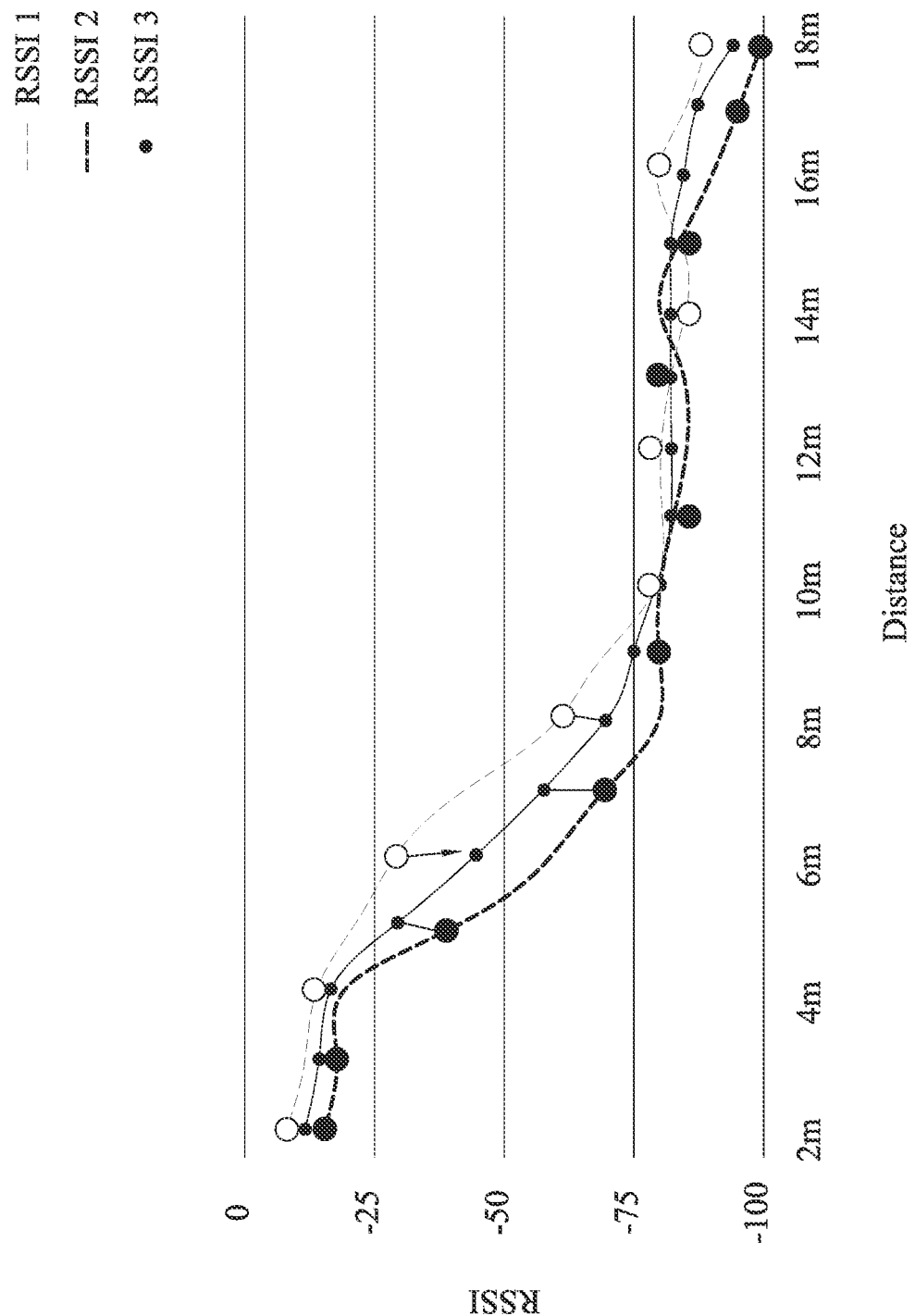
FIG. 8 shows a RSSI-distance curve after compensation according to some embodiments of the present disclosure.

Reference is made to FIG. 8. FIG. 8 shows a RSSI-distance curve after compensation according to some embodiments of the present disclosure. When the difference between RSSI 1 and RSSI 2 is large, the RSSI-distance curves of the two can be used to resample and reconstruct the RSSI-distance curve of RSSI 3. For example, a distance of the remote device 140 and the communication module 121 is increased from 2 meters to 18 meters. In the first timepoint (2 m), both the RSSI 1 and RSSI 2 are sampled for calculating the RSSI 3. In the second timepoint, only the RSSI 1 is sampled for calculating the RSSI 3. In the third timepoint, only the RSSI 2 is sampled for calculating the RSSI 3. In the last timepoint (18 m), both the RSSI 1 and RSSI 2 are sampled for calculating the RSSI 3. In this example, RSSI 1 and RSSI 2 may be sampled simultaneously or not. Thus, sampling times of the RSSI-distance curves of RSSI 1 and RSSI 2 may be different. As such, data that is too peculiar and unreasonable in the RSSI-distance curves of RSSI 1 and RSSI 2 can be filtered out, which can effectively increase the accuracy of the reconstructed RSSI-distance curve of RSSI 3.

In some practical applications, by using the distance determination method, the shortcoming of insufficient positioning of the vehicle 120 can be improved. In some practical applications, by using the distance determination method, the shortcoming of starting the vehicle 120 based on an inaccurate distance can be improved.

Figure 9:
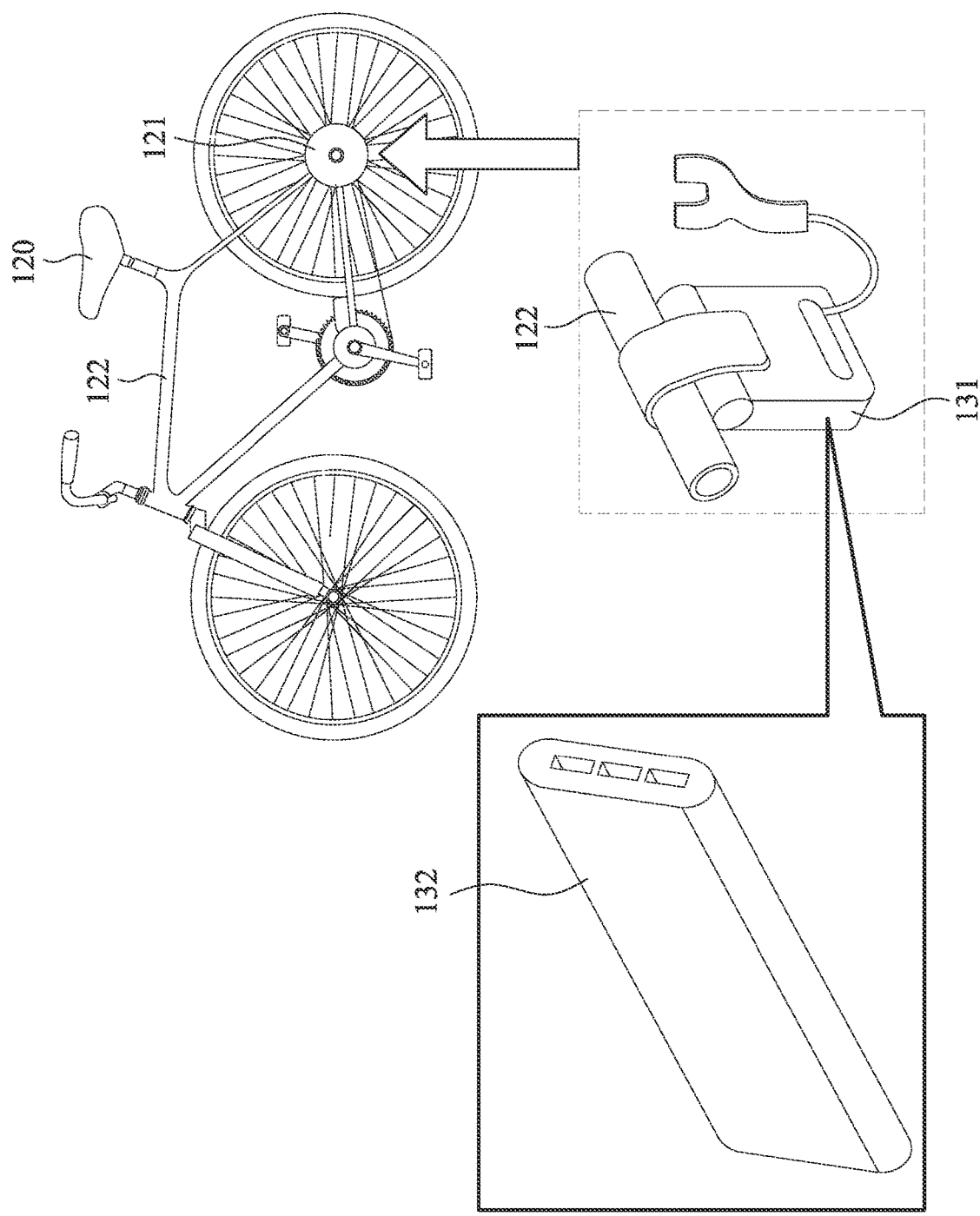
FIG. 9 is a schematic diagram of a vehicle according to some embodiments of the present disclosure.

Reference is made to FIG. 9. FIG. 9 is a schematic diagram of the vehicle 120 according to some embodiments of the present disclosure. As shown in FIG. 9, in the present embodiment, the vehicle 120 can be equipped with a bag 131 and a PDC (Power delivery charger) 132. The bag 131 may be tied on the vehicle 120. For example, the vehicle 120 may be an electric bicycle, and the bag 131 may be tied on the frame 122 of the vehicle 120. The PDC 132 is accommodated in the bag 131. The PDC 132 may be a charger using common USB type C connector and USB PD protocol as an energy source.

In some embodiments, the PDC 132 is connected to a charging connector of the communication module 121, so as to supply power to the communication module 121. In some embodiments, the communication module 121 is a hub device installed on the rear wheel of the vehicle 120, and is configured to provide auxiliary power to turn the rear wheel. In some embodiments, the user can use his/her USB PD charger or USB-PD power bank to supply power to the PDC 132.

In some practical application, since the power bank can be used as a source of electrical energy, the vehicle 120 can be charged anytime and anywhere during the commute. In some practical applications, since the PDC 132 conforms to the USB PD protocol, no dedicate charger is needed anymore. In some practical application, with the PDC 132, the vehicle 120 can be charged during riding. In some practical application, when a customer rents the vehicle 120 and charges the vehicle 120 with its own power bank, the cost of maintaining the vehicle 120 by the service provider can be reduced. At the same time, the service provider can give the customer some preferential discounts. In some practical application, when the vehicle 120 is in an environment around zero degrees, immediately starting and riding the vehicle 120 may be limited by the low temperature of the built-in battery and poor discharge performance. If the user can carry the power bank from a 20-degree indoor environment to the vehicle 120 and start the vehicle 120, in addition to providing power, the power bank can also make the built-in battery heat up while the power is flowing to the built-in battery.

Figure 10:
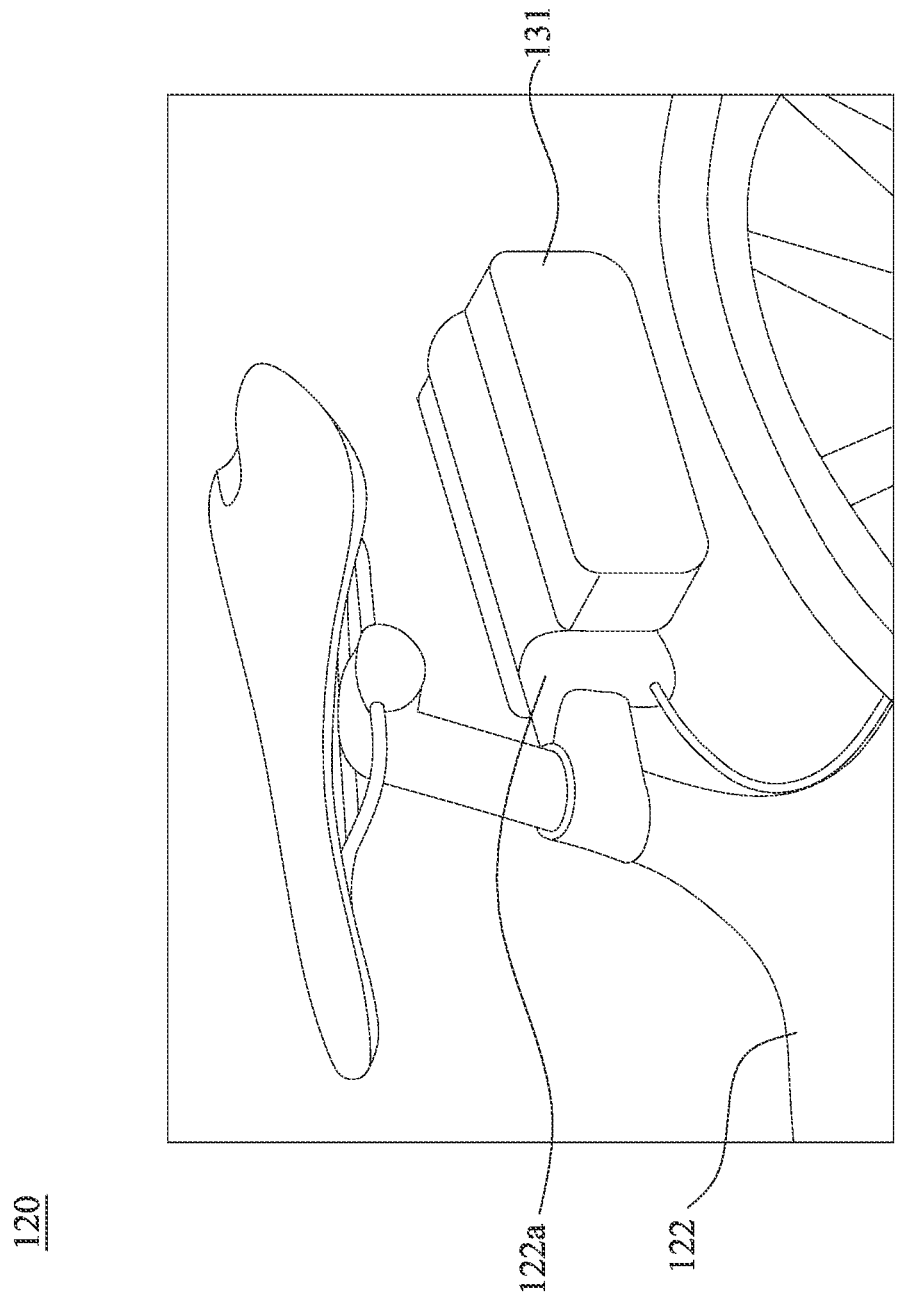
FIG. 10 is a partial schematic diagram of the vehicle according to some embodiments of the present disclosure.

Reference is made to FIG. 10. FIG. 10 is a partial schematic diagram of the vehicle 120 according to some embodiments of the present disclosure. As shown in FIG. 10, a hard housing 122a is mounted onto the frame 122, and the bag 131 hangs on the hard housing 122a. The hard housing 122a may be located under the seat cushion and extend toward the rear of the vehicle 120 above the rear wheel thereof. The circuit board of the PDC 132 may be accommodated in the hard housing 122a. Additional power banks may be accommodated in the bag 131. In some embodiment, the hard housing 122a may be detachably fastened to the frame 122. In some other embodiment, the hard housing 122a may be an integrally-formed part of the frame 122.

Figure 11:
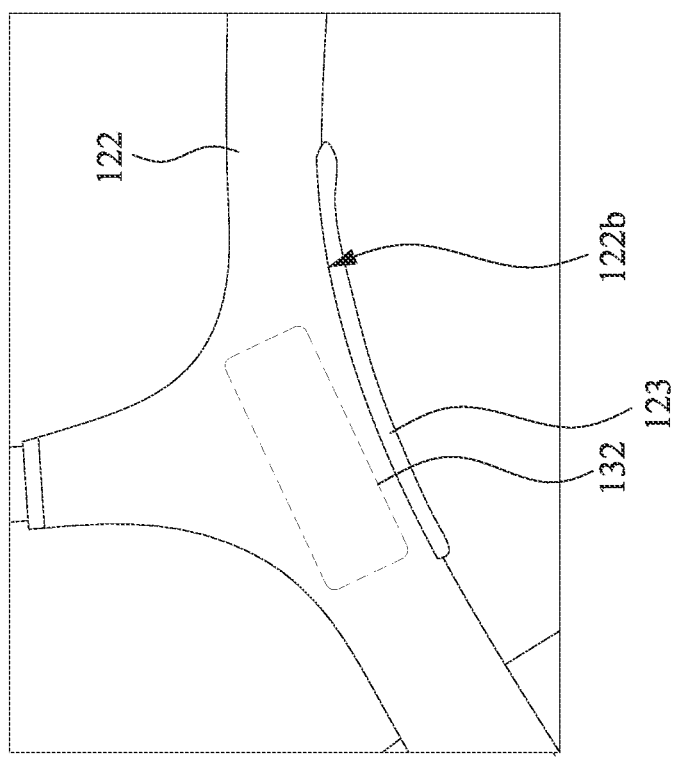
FIG. 11 is a partial schematic diagram of the vehicle to some embodiments of the present disclosure.

Reference is made to FIG. 11. FIG. 11 is a partial schematic diagram of the vehicle 120 to some embodiments of the present disclosure. As shown in FIG. 11, in the present embodiment, the frame 122 has an opening 122b at the bottom side and is hollow inside, and the PDC 132 is installed in the frame 122 from the opening. The opening 122b is sealed by a sealing member 123, so as to prevent the PDC 132 from falling out. That is, compared with the embodiment shown in FIG. 9, the PDC 132 of the present embodiment is directly installed in the frame 122 of the vehicle 120.

According to the foregoing recitations of the embodiments of the disclosure, it can be seen that in the distance determination method of the present disclosure, two-way RSSI is adopted, so that the distance between two electronic devices can be accurately determined. In this way, by using the distance determination method in the embodiments that the two electronic devices are a remote device of a user and a communication module attached to a vehicle, at least the purpose of automatically locking/unlocking the vehicle with a better accuracy can be achieved based on the accurate distance determined by the distance determination method.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A distance determination method, comprising:
   detecting, at a second electronic device, a first received signal strength indicator (RSSI) of a wireless signal sent from a first electronic device;
   detecting, at the first electronic device, a second RSSI of a wireless signal sent from the second electronic device;
   obtaining, at the first electronic device, the first RSSI from the second electronic device; and
   calculating, at the first electronic device, a distance of the second electronic device relative to the first electronic device according to the first RSSI and the second RSSI; and
   starting a process of certification between the first electronic device and the second electronic device when the distance continues to decrease.

2. The distance determination method of claim 1, wherein the calculating comprises:
   determining a first distance based on the first RSSI and a first relationship of RSSI and distance;
   determining a second distance based on the second RSSI and a second relationship of RSSI and distance;
   determining the distance based on the first distance and the second distance.

3. The distance determination method of claim 1, further comprising:
   requesting a random number from the first electronic device by the second electronic device;
   providing the random number to the second electronic device by the first electronic device;
   providing a temporary key generated based on the random number to the first electronic device by the second electronic device; and
   verifying the temporary key with a built-in authentication code pre-stored in the first electronic device by the first electronic device.

4. The distance determination method of claim 1, wherein one of the first electronic device and the second electronic device is a remote device or an accessory, and another of the first electronic device and the second electronic device is a communication module attached to a vehicle.

5. The distance determination method of claim 4, further comprising:
   automatically locking/unlocking the vehicle based on a certification result and the distance.

6. The distance determination method of claim 4, further comprising:
   establishing a first connection between the remote device the communication module;
   establishing a second connection between the remote device the accessory; and
   establishing a third connection based on the first connection and the second connection.

7. The distance determination method of claim 6, further comprising certificating the first connection, wherein the certificating comprises:
   requesting a random number from the communication module by the remote device;
   providing the random number to the remote device by the communication module;
   transferring the random number to a server by the remote device;
   creating a temporary key by the server in response to receiving of the random number;
   providing the temporary key to the communication module via the remote device by the server; and
   verifying the temporary key with a built-in authentication code pre-stored in the communication module by the communication module.

8. The distance determination method of claim 1, wherein the calculating comprises:
   averaging the first RSSI and the second RSSI.

9. The distance determination method of claim 1, further comprising:
   retrieving a first RSSI-distance curve of the first RSSI;
   retrieving a second RSSI-distance curve of the second RSSI; and
   calculating a third RSSI-distance curve based on the first RSSI-distance curve and the second RSSI-distance curve,
   wherein the calculating comprises calculating the distance based on the third RSSI-distance curve.

10. The distance determination method of claim 9, wherein the calculating the third RSSI-distance curve comprises at least one of:
    averaging the first RSSI-distance curve and the second RSSI-distance curve;
    calculating the third RSSI-distance curve by resampling the first RSSI-distance curve and the second RSSI-distance curve at different sampling distances; and
    calculating the third RSSI-distance curve by iteratively resampling the first RSSI-distance curve and the second RSSI-distance curve as sampling distance changes.

11. A vehicle, comprising:
    a frame;
    a rear wheel, rotatably connected to the frame and turned by pedaling a pedal;
    a hub device installed on the rear wheel for providing auxiliary power to turn the rear wheel and comprising a charging connector and a built-in battery; and
    a power delivery charger, detachably connected to the charging connector, including a USB connector for detachably connected to a USB power bank, and configured to deliver power from the USB power bank to the built-in battery via the charging connector for charging the built-in battery and heating the built-in battery during operation.

12. The vehicle of claim 11, further comprising a bag tied on the frame, wherein the power delivery charger is accommodated in the bag.

13. The vehicle of claim 11, wherein the vehicle is an electric bicycle.

14. The vehicle of claim 11, further comprising:
    a hard housing connected to the frame and accommodating a circuit board of the power delivery charger; and
    a bag hanging on the hard housing, wherein the USB power bank is in the bag.

15. The vehicle of claim 14, further comprising:
    a seat cushion connected to the frame, wherein the hard housing is located under the seat cushion and extends toward the rear of the vehicle above the rear wheel, wherein the hard housing is detachably fastened to the frame.

16. The vehicle of claim 11, wherein the frame has an opening at a bottom side thereof and is hollow inside, the power delivery charger is accommodated in the frame, and the opening is configured to allow the power delivery charger to pass through.

17. The vehicle of claim 16, further comprising a sealing member sealing the opening.

* * * * *